Patented May 5, 1931

1,803,816

UNITED STATES PATENT OFFICE

CLARENCE J. STROBEL, OF MARYSVILLE, MICHIGAN, AND ALLEN P. TALLMAN, OF TOLEDO, OHIO

WATERPROOF PAPER

No Drawing. Application filed March 21, 1928. Serial No. 263,583.

The present invention relates to the making of emulsions and to process of using these emulsions, particularly for the purpose of waterproofing materials, such as paper and the like.

Among the objects of the invention is to provide an easy and reliable method of emulsifying certain materials heretofore considered either not emulsifiable or extremely difficult to emulsify or maintain in the emulsified condition.

Another object of the invention is the process of using such emulsified materials to waterproof paper and the like.

Still another object is water proofed paper made by the process indicated.

Still other objects will readily occur to those skilled in the art upon reference to the following description.

The preparation of the emulsion is accomplished by first preparing a stabilizer for assisting in and rendering stable, the emulsion of the resinous or like material. This stabilizer is preferably made by cooking together rosin, abietic acid or its anhydride, or one of the other fatty acids and about ten per cent of its weight of sodium carbonate. When the saponification reaction has been completed, there is added the gum, or a combination of gum and oil, to be emulsified and the whole thoroughly cooked to a temperature of approximately 500° F. While the composition thus prepared is still at a high temperature, distilled water is introduced slowly while thoroughly mixing. Sufficient water is added to make the resulting emulsion relatively fluid and the composition then allowed to cool to ordinary temperature.

The gum which it is preferred to use for the present purpose is Pará-cumarone, which is a synthetic resin and obtainable in several grades, any one of which may be used for the present purpose. Instead of Pará-cumarone, it is also proposed to use asphalt, mineral rubber, copal, gilsonite gums or combinations of these and the oil may be linseed, China wood (tung), castor, corn, croton, menhaden, cottonseed or others. These oils may be used in either the bodied or raw state.

A typical formula for the emulsion is as follows:—

10 lbs. sodium carbonate, 100 lbs. rosin, 400 lbs. East India gum, 40 gal. light pressed menhaden oil, making about 800 lbs. of the constituents to which is added 800 lbs. of water, equaling about 200 gallons of the batch.

After the emulsion has been properly prepared and allowed to cool to ordinary temperatures, it is added to the beater in making paper and thoroughly mixed with the fluent pulp therein. The proportion of the emulsion to be added, depends upon the characteristics desired in the paper. If only a light water proofing is desired, smaller amounts will, of course, be added than if a heavier waterproofing is wished.

After the proper amount of emulsion has been thoroughly mixed with the pulp in the beater, a precipitating agent is employed to throw the gum out of its emulsified condition and precipitate it on the fibers of the pulp. The gum in the fine state of division in which it is emulsified is so dispersed through the emulsion that each fiber is surrounded thereby and when precipitation takes place, each fiber is apparently uniformly coated with the precipitated gum. The pulp is then taken from the beater and the paper prepared in the usual way and dried. In the drying process, it is desirable that considerable heat be used to drive off the water.

Instead of putting the emulsion in the beater, a very satisfactory water proof paper may be produced by applying the emulsion to several layers or plies of the paper web as they pass from the paper making cylinders so that each web receives an application of the emulsion before it contacts with the next web and the several webs are then passed over the calenders to consolidate the whole and form in effect a single sheet.

In this method of applying the emulsion, the precipitating agent is incorporated in the pulp and is present in the web as it passes over the emulsion applying device which later may be the ordinary lickup roll.

The preferred precipitating agent when the emulsion is precipitated in the beater is alum, as this acts somewhat slower and does not cause clotting, although other agents may be used, such as hydrochloric, acetic, sulphuric acid and the like or the gum may be precipitated electrically.

In the method of applying the emulsion to the paper web, the acid which may be present in the web may be used as the precipitating agent and, in this process, the best results are obtained when heat is applied to the mass during and after the precipitation period.

Now having described the invention and the preferred forms of embodiment thereof, it is to be understood that the said invention is to be limited, not to the specific details herein set forth, but, only by the scope of the claim which follows.

We claim:—

As a new article of manufacture, a paper having distributed throughout between its fibers, Pará-cumarone and menhaden oil.

CLARENCE J. STROBEL.
ALLEN P. TALLMAN.